(12) United States Patent
Drake

(10) Patent No.: US 7,046,229 B1
(45) Date of Patent: May 16, 2006

(54) COMPUTER INPUT DEVICE PROVIDING ABSOLUTE AND RELATIVE POSITIONAL INFORMATION

(75) Inventor: Victor P. Drake, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/295,171

(22) Filed: Apr. 20, 1999

(51) Int. Cl.
*G09G 5/00* (2006.01)

(52) U.S. Cl. .............. 345/156; 345/157; 345/158; 345/159; 345/161; 345/163; 178/18.01; 382/313; 341/21; 463/38

(58) Field of Classification Search ............. 345/187, 345/157, 162, 163, 156, 161, 166; 341/9, 341/21; 382/313; 178/18.01; 463/38
See application file for complete search history.

(56) References Cited

U.S. PATENT DOCUMENTS

| | | | | |
|---|---|---|---|---|
| 5,059,958 A | | 10/1991 | Jacobs et al. ............... 340/706 |
| 5,175,534 A | | 12/1992 | Thatcher ..................... 340/706 |
| 5,432,530 A | | 7/1995 | Arita et al. ................. 345/159 |
| 5,589,828 A | | 12/1996 | Armstrong ................... 341/20 |
| 5,590,062 A | | 12/1996 | Nagamitsu et al. ......... 364/578 |
| 5,624,117 A | | 4/1997 | Ohkubo et al. ............. 273/148 |
| 5,694,153 A | * | 12/1997 | Aoyagi et al. .............. 345/156 |
| 5,703,623 A | | 12/1997 | Hall et al. .................. 345/158 |
| 5,739,811 A | | 4/1998 | Rosenberg et al. ......... 345/161 |
| 5,771,037 A | * | 6/1998 | Jackson ...................... 345/157 |
| 5,785,317 A | | 7/1998 | Sasaki ........................ 273/148 |
| 5,798,748 A | * | 8/1998 | Hilton et al. ............... 345/156 |
| 5,821,920 A | * | 10/1998 | Rosenberg et al. ......... 345/156 |
| 5,874,906 A | | 2/1999 | Willner et al. ................ 341/22 |
| 5,898,432 A | | 4/1999 | Pinard ........................ 345/334 |
| 5,903,257 A | | 5/1999 | Nishiumi et al. ........... 345/157 |
| 5,919,092 A | | 7/1999 | Yokoi et al. .................. 463/37 |
| 5,943,233 A | * | 8/1999 | Ebina et al. ................ 345/161 |
| 5,956,045 A | * | 9/1999 | Gotoh et al. ................ 345/156 |
| 5,959,613 A | | 9/1999 | Rosenberg et al. ......... 345/161 |
| 5,990,893 A | * | 11/1999 | Numazaki ................... 345/358 |
| 6,057,826 A | * | 5/2000 | Gaultier et al. ............. 345/145 |
| 6,075,468 A | * | 6/2000 | Sugiyama ...................... 341/5 |
| 6,078,312 A | * | 6/2000 | Liebenow ................... 345/166 |
| 6,088,019 A | * | 7/2000 | Rosenberg .................. 345/156 |
| 6,100,871 A | | 8/2000 | Min ........................... 345/145 |
| 6,128,006 A | * | 10/2000 | Rosenberg et al. ......... 345/163 |
| 6,198,471 B1 | | 3/2001 | Cook .......................... 345/161 |
| 6,326,948 B1 | * | 12/2001 | Kobachi et al. ............ 345/157 |
| 6,580,417 B1 | * | 6/2003 | Rosenberg et al. ......... 345/157 |
| 6,614,420 B1 | * | 9/2003 | Han et al. ................... 345/161 |
| 6,664,946 B1 | | 12/2003 | Stipes et al. ................ 345/157 |

FOREIGN PATENT DOCUMENTS

| | | |
|---|---|---|
| EP | 0 680 132 A1 | 4/1995 |
| GB | 2346455 A | 8/2000 |
| JP | 07116351 | 5/1995 |
| JP | 08103567 | 4/1996 |
| JP | 10295937 | 11/1998 |
| WO | WO 95/32777 | 12/1995 |
| WO | WO 98/24180 | 6/1998 |
| WO | WO 99/24965 | 5/1999 |

OTHER PUBLICATIONS

Brochure, "Feel Me...", Immersion Corporation.
Copy of French Search Report dated Nov. 28, 2002.

* cited by examiner

*Primary Examiner*—Xiao Wu
*Assistant Examiner*—Abbas Abdulselam
(74) *Attorney, Agent, or Firm*—Westman, Champlin and Kelly, LLC

(57) ABSTRACT

A computer input device includes a base, a movable member that is displaceable relative to the base, and a sensor that is operably coupled to the movable member. The sensor provides an output signal to circuitry indicative of position of the movable member relative to the base. The circuitry defines movements of the movable member relative to the base as within an absolute motion region and a relative motion region.

49 Claims, 10 Drawing Sheets

COMPUTER INPUT DEVICE PROVIDING ABSOLUTE AND RELATIVE POSITIONAL INFORMATION

BACKGROUND OF THE INVENTION

The present invention relates to an input device for a computer system. More specifically, the present invention relates to an input device for providing position information to the computer system based on manipulation of the input device.

A traditional computer input device, such as a mouse, includes a housing with a ball mounted in the housing. The ball is either configured in a traditional manner in which, in the normal work position, the ball engages a work surface and rotates based on the user's movement of the mouse across the work surface. The ball may also be provided as a track ball, which is rotated by digital manipulation from the operator. In either case, position encoders are used to detect rotation of the ball, and to provide positional information indicative of that rotation to the computer. In many instances, the positional information is used to control movement of a visual image (such as a mouse cursor) on the display screen of the computer. This type of input device is referred to as an "absolute" positioning device since movement of the ball correlates to scaled movement of the cursor on the display.

Other input devices that provide absolute positioning include touch-sensitive pads or levers that move in a x-y plane. Touch-sensitive pads are typically fixed in a housing where an operator, using a finger or other pointing device, directs scaled movement of the cursor in a limited range of motion defined by the perimeter of the touch-sensitive pad. Lever operated input devices allow the operator to move an end of the lever in a limited range of motion. Sensors, located within the housing, track or measure movement of a remote end of the lever from the operator to control cursor movement.

Generally, absolute position devices provide fine resolution and intuitively allow the user to correlate movement of the input device with movement of the cursor. However, long strokes or repeated operation is necessary in order to direct the cursor through large movements on the display or any document that cannot be displayed as a single page.

Other input devices operate under a different principle herein referred to as "relative motion". One commonly found embodiment of this type is a small joystick that has been placed between keys of a keyboard. An operator pushes the joystick in a direction corresponding to desired movement of the cursor where the magnitude of pressure exerted upon the joystick translates to speed of the cursor in the desired direction. Relative motion input devices are advantageous when large distances must be traversed by the cursor. However, such devices may be cumbersome or awkward to use when fine resolution is necessary.

SUMMARY OF THE INVENTION

A computer input device includes a base, a movable member that is displaceable relative to the base, and a sensor that is operably coupled to the movable member. The sensor provides an output signal to circuitry indicative of position of the movable member relative to the base. The circuitry defines movements of the movable member relative to the base as within an absolute motion region and a relative motion region.

DETAILED DESCRIPTION OF THE ILLUSTRATIVE EMBODIMENTS

The present invention provides a user input device for generating positional information and providing that information to a computer system. The positional information is generated based on detected position of the user input device, or a portion thereof. In one aspect of the present invention, the position is mapped with respect to two defined regions, wherein the positional information is provided as a function of one of the defined regions.

Overview

Figure 1:
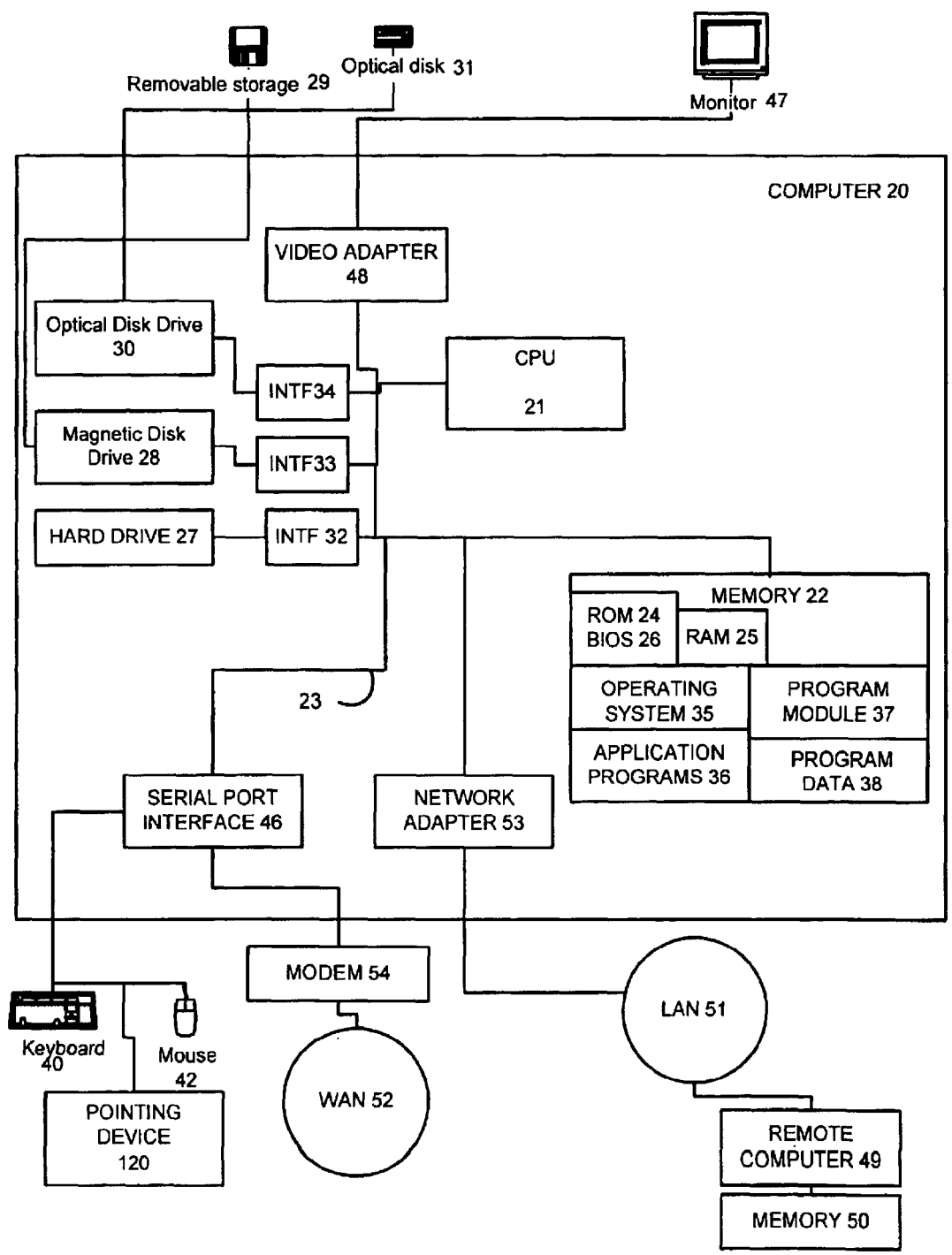
FIG. 1 is a block diagram of an exemplary environment for implementing an input device in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules being executed by a controller, a personal computer or other computing device. Generally, program modules include routine programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device (mouse) 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2A:
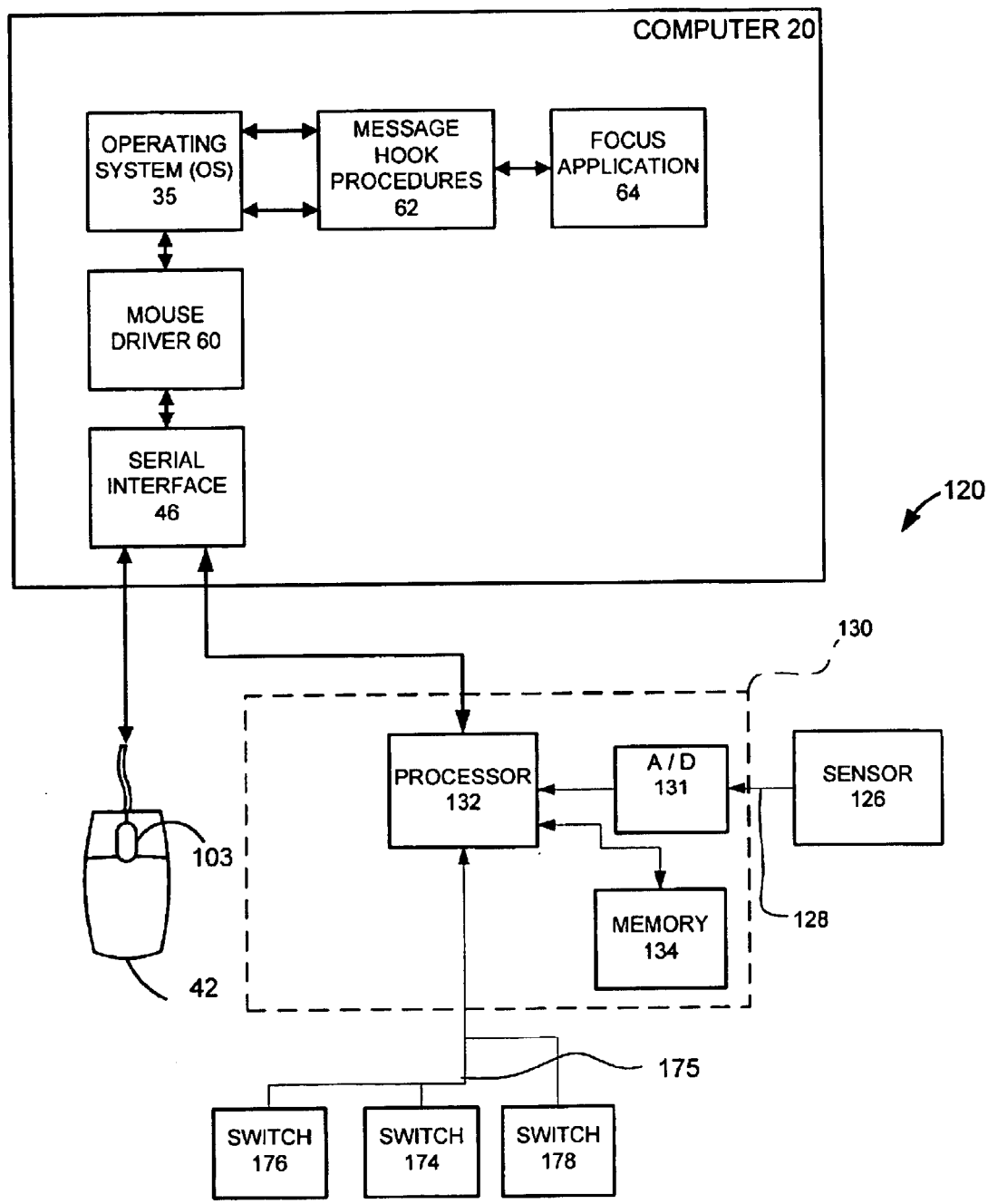
FIG. 2A is a functional block diagram of a computer and an input pointing device as used in one embodiment of the present invention.

For a better understanding of the present invention, a brief discussion of mouse message processing is now provided. FIG. 2A is a functional block diagram of computer 20 used with mouse 42 in accordance with one embodiment of the present invention. Mouse 42 illustratively has right and left buttons and a depressible, rotatable wheel 103 there between. The block diagram of computer 20 shown in FIG. 2A includes a number of the items discussed with respect to FIG. 1, and those items are similarly numbered. However, the block diagram in FIG. 2A also shows a number of components in greater detail which are used in processing a mouse message. Computer 20 includes mouse driver 60, operating system 35, message hook procedure 62, and focus application 64. To better understand the operation of input device 42 in computer system 20 shown in FIG. 2A, the components of that system are discussed in connection with a data structure illustrated in FIG. 2B.

Figure 2B:
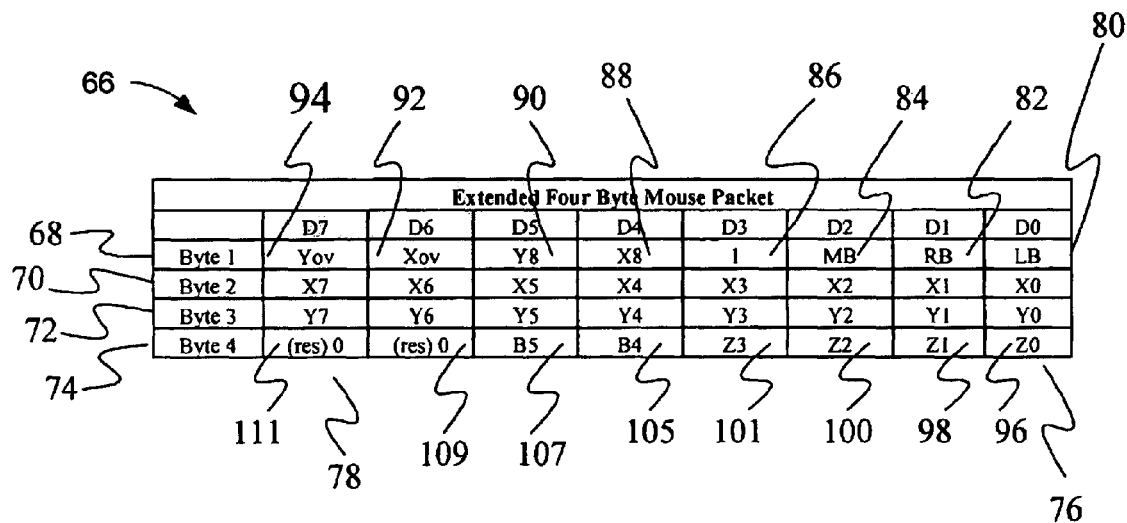
FIG. 2B illustrates a packet of information generated by an input pointing device for transmission to the computer.

FIG. 2B illustrates an exemplary four-byte mouse packet 66 in a row and column format with bytes 68, 70, 72, and 74 shown in rows and the individual bits of each byte shown in columns. Byte 68 is the first byte provided by mouse 42, byte 70 is the second byte, byte 72 is the third byte, and byte 74 is the fourth byte. The columns of bits are organized with the least significant bits on the far right and the most significant bits on the far left. Thus, column 76 includes the least significant bits of each of the four bytes and column 78 includes the most significant bits of the four bytes.

Within mouse packet 66, first byte 68 includes left button bit 80, right button bit 82, and middle button bit 84. A one in the left button bit 80 indicates that the left button is depressed and a zero in left button bit 80 indicates the left button is not depressed. Similarly, a one in the right button bit 82 or middle button bit 84 indicates that the right button or the middle button, respectively, are depressed and a zero in either of these bits indicates that their respective button is not depressed.

Fourth bit 86 is set to a one.

Fifth bit 88 of byte 68 is the ninth bit of a 9-bit signed value that is completed by byte 70. The 9-bit value produced by the combination of bit 88 and byte 70 represents the direction and magnitude of movement of the mouse along the X-coordinate. Since the 9-bit value is in two's complement format, bit 88 indicates the direction of mouse movement such that if it has a value if zero, mouse movement is in a positive X direction and if it has a value of one, mouse movement is in the negative X direction.

Sixth bit 90 of first byte 68 is the ninth bit of a 9-bit signed value that is completed by byte 72. The combination of bit 90 and third byte 72 produces a value that indicates the magnitude and direction and movement of the mouse along the Y coordinate. Since this value is a two's complement signed value, bit 90 indicates the direction of movement along the Y coordinate such that if it has a value of one, the mouse movement is in a negative Y direction and if it has a value of zero, the mouse movement is in a positive Y direction.

Seventh bit 92 and eighth bit 94 of first byte 68 indicate whether the 9-bit values formed by bit 88 and byte 70 and by bit 90 and byte 72, respectively, have incurred an overflow condition. This occurs when more than nine bits of movement have been detected by the mouse. In this condition, the respective 9-bit value should be set to its maximum magnitude for the direction of movement.

The least significant four bits 96, 98, 100 and 101 of fourth byte 74 represent the direction and magnitude of movement of wheel 103 (illustrated in FIG. 2A). The value represented by bits 96–101 is a signed value wherein a positive value indicates wheel motion toward the user and a negative value indicates wheel motion away from the user.

Bits 105 and 107 are the fifth and sixth bits of byte 74, respectively, and indicate operation of the left and right buttons, respectively, of mouse 42. Thus, when bit 105 has a value of one, the switch associated with the left button is closed indicating that the corresponding mouse button has been depressed. Bit 107 reflects closure of the switch associated with right mouse button in a similar fashion.

Bits 109 and 111 of fourth byte 74 are reserved for later use and are set to zero. Those skilled in the art will recognize that mouse packet 66 illustrated in FIG. 2B and the serial interface 46 described below are used in PS/2 and serial mouse connections. For universal serial bus (USB) connections, the mouse information is sent to the mouse driver using publicly available USB protocols for mice.

In order to describe the processing of a conventional mouse message, reference is made to both FIGS. 2A and 2B. To initiate a mouse message, the user first manipulates mouse 42. Based on this manipulation, mouse 42 generates a mouse packet that is passed to serial interface 46 and which is indicative of the manipulation event. When serial interface 46 receives mouse packet 66, it converts the serial information in mouse packet 66 into a set of parallel packets and provides the parallel packets to mouse driver 60. Mouse driver 60 creates a mouse message based on the manipulation event. The creation of the mouse message is identical to the manner in which existing mice create mouse messages.

The mouse message is then transmitted to operating system 35. In one illustrative embodiment, operating system 35 is a "WINDOWS NT®", a "WINDOWS 95®", or a "WINDOWS 98®", brand operating system (provided by Microsoft Corporation of Redmond, Wash.). Operating system 35 includes a mouse message hook list that identifies a series of mouse message hook procedures 62. When operating system 35 receives the mouse message from mouse driver 60, it examines the mouse message hook list to determine if any mouse message hook procedures have registered themselves with operating system 35. If at least one mouse message hook procedure has registered itself with operating system 35, operating system 35 passes the mouse message to the registered mouse message hook procedure 62 that appears first on the list.

The called mouse message hook executes and returns a value to operating system 35 that instructs the operating system to pass the mouse message to the next registered mouse message hook.

The mouse message may, for example, represent a command to an application, which owns the window currently under focus in computer 20. In that instance, the message hook procedure 62 issues the command to the focus window application. In response, the focus window application 64 performs the desired function.

After the message hook procedure 62 issues the command to the focus application 64, the message hook procedure 62 consumes the mouse message by removing the message from the message chain. This is accomplished by returning a value to operating system 35, which indicates to the operating system that it should not pass the mouse message to any other message hook procedures.

Referring to FIGS. 1 and 2A, an aspect of the present invention is embodied as a computer input device 120. In one embodiment, computer input device 120 provides positional information to computer 20 as mouse messages described above. Computer input device 120 is illustrated as being operably connected to serial port interface 46; however, it should be understood that this is only but one embodiment and that computer input device 120 can be operably connected to computer 20 using other interfaces and/or provide positional information using other known protocols. For instance, the Human Interface Devices (HID) class of USB allows data to be defined in numerous ways. The positions of the bits, the use of relative or absolute counts, the width of fields and the numerical representations of values can all be varied. In general, a mouse packet transmits position and button information to the host in a format expected by the host.

Figure 3:
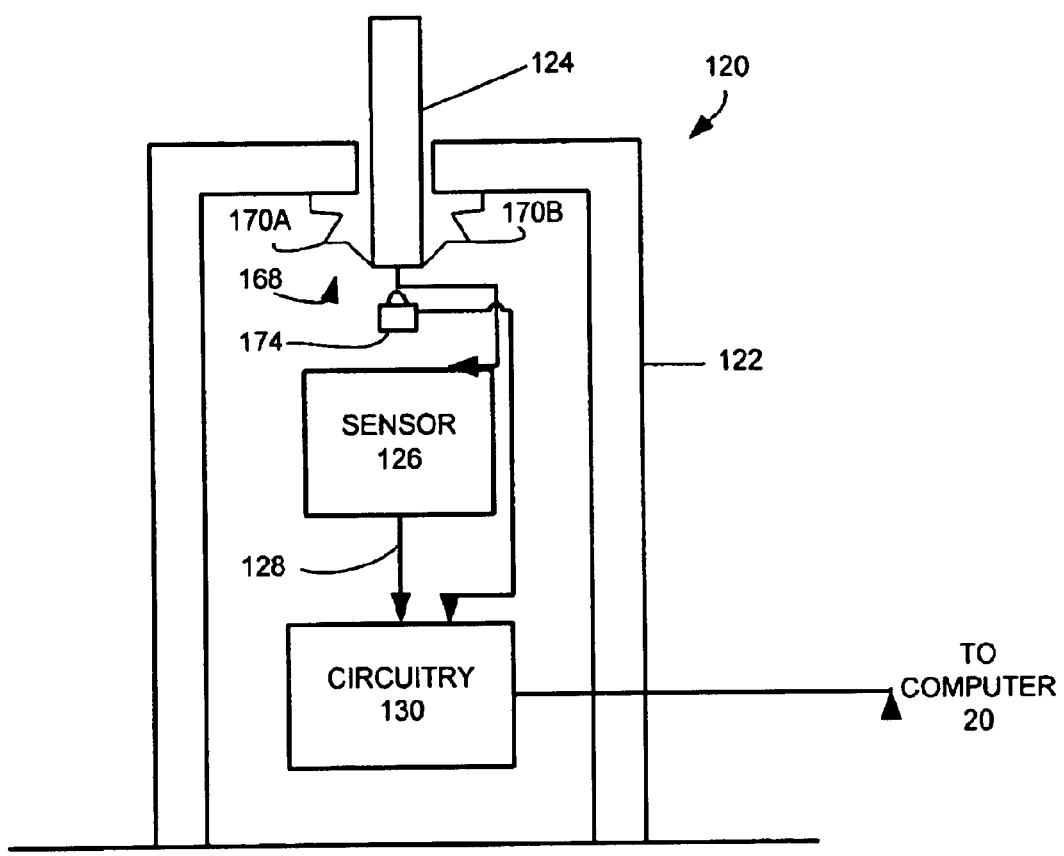
FIG. 3 illustrates a computer input device, shown in partial sectional and partial block diagram form, in accordance with one embodiment of the present invention.

FIG. 3 is a more detailed diagram, in partial block form and partial schematic form, illustrating computer input device 120 in accordance with one embodiment of the present invention. Generally, computer input device 120 includes a base member 122, such as a housing, and an operator actuated member 124 that is movable relative to base member 122. A sensor 126 is operably coupled to movable member 124. The sensor 126 provides an output signal 128 indicative of movement of the movable member 124 relative to the base member 122. Circuitry 130 is operably coupled to sensor 126 to receive and process output signal 128 into positional information for transmission to computer 20.

Figure 4:
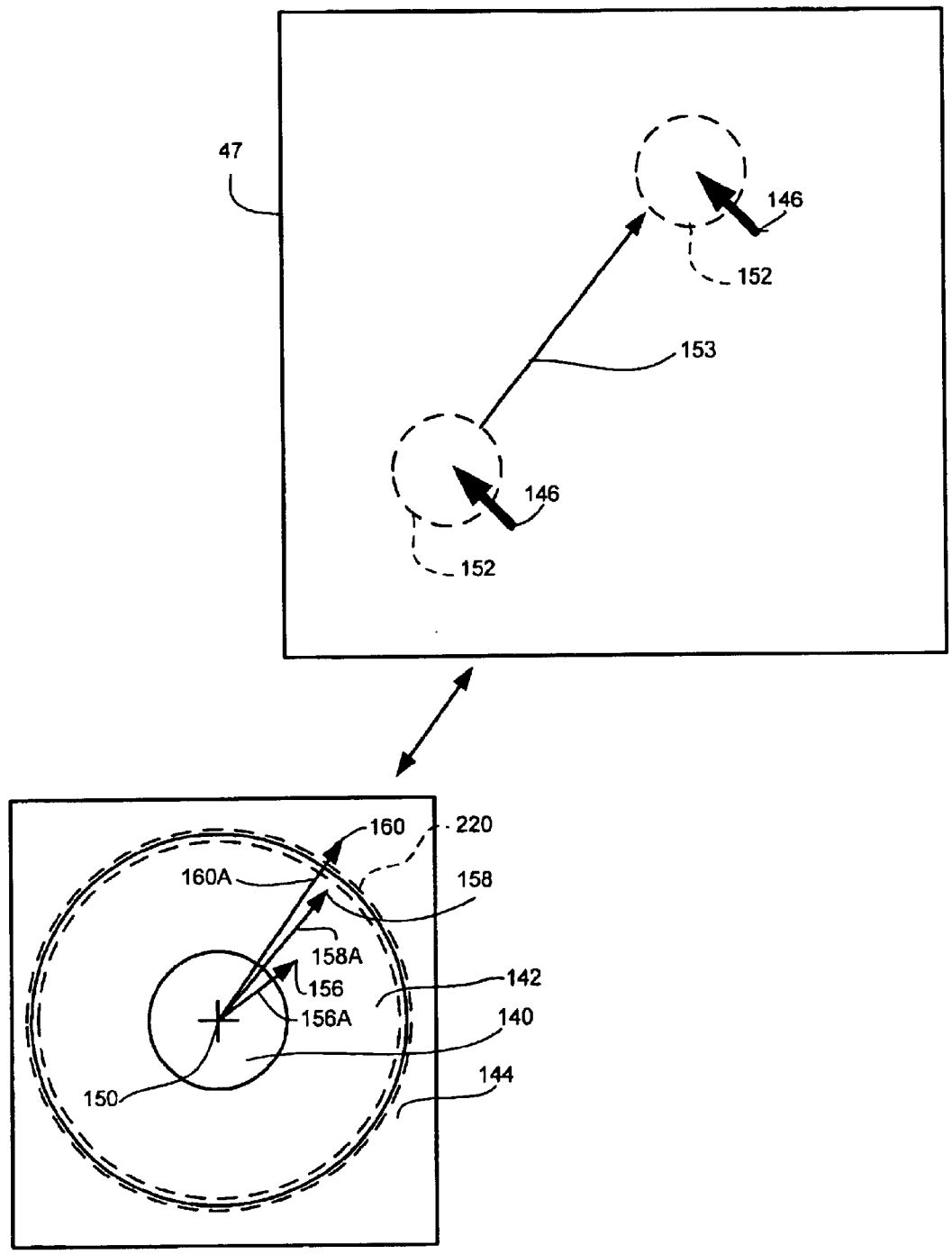
FIG. 4 is a pictorial representation of three operating regions of the computer input device with corresponding effects on a monitor.

In one embodiment as illustrated in to FIG. 2A, circuitry 130 includes a processor 132 that is operably coupled to the sensor 126 to receive the output signal 128. In the embodiment illustrated, sensor 126 provides an analog output signal. An analog-to-digital converter 131 converts the output signal 128 to a digital signal suitable for processor 132. Processor 132 is further coupled to a computer readable medium 134, such as EPROM, RAM or ROM (hereinafter "memory"). Memory 134 stores instructions which, when executed by processor 132, map movements of the movable member 124 (FIG. 3) relative to the base member 122 (FIG. 3) as being within at least two of three regions 140, 142 and 144 (FIG. 4). Processor 132 processes the output signal 128 to provide positional information as a function of one of the defined regions 140, 142 and 144 as illustrated in FIG. 4.

It should be also noted that in an alternative embodiment, output signal 128 can be directly provided to computer 20 to determine the position of the movable member 124 relative to the base member 122 in terms of the regions 140, 142 and 144. In other words, circuitry 130 can include the processor 21. The processor 21 can execute instructions stored on computer readable medium in any of the storage devices illustrated in FIG. 1 to process the output signal and provide positional information as a function of one of the defined regions 140, 142 and 144. In yet a further embodiment, the circuitry 130 can be analog circuitry that receives the sensor output signal 128 (which can be for example a function of a change in resistance, capacitance or some other parameter) and processes the output signal 128 to determine if the movable member 124 is within one of the regions 140, 142 or 144. For instance, the analog circuitry can include operational amplifiers forming comparative circuits to compare the output signal to preselected values in order to determine whether the movable member 124 is in one of the regions

140, 142 and 144. The output signals from the comparative circuits and the output signal 128 can then be further processed by the processor 134 or the processor 21.

FIG. 4 is a pictorial representation of three regions 140, 142 and 144 within which the movable member 124 can move relative to base member 122. Regions 140, 142 and 144 each provide unique positional information as a function of movement of the movable member 124 therein. FIG. 4 further illustrates movement of a cursor 146 on monitor 47 in accordance with movements of the movable member 124 within the regions 140, 142 and 144.

Referring first to region 140, this region is an "absolute motion region" where one-to-one scaled correspondence exists between a position of the movable member 124 relative to the base member 122 and a position of the cursor 146 on monitor 47. In absolute motion region 140, cursor 146 only moves when movable member 124 is being moved by the operator. Scaled correspondence between a position of movable member 124 and the position of the cursor 146 can be less than, equal to, or greater than one depending on the resolution desired. In operation, absolute motion region 140 will commonly be used to acquire a desired target or icon currently displayed on monitor 47. A center or "home" position 150 of movable member 124 is located within absolute motion region 140 so as to provide a reference position in defining movements of movable member 124. However, movement of cursor 146 with one-to-one scaled correspondence in absolute motion region 140 is generally limited as illustrated with dashed line 152 on monitor 47. The limited movement of movable member 124 within absolute motion region 140 enables high resolution with direct feedback in order that the operator can direct fine or precise movements of cursor 146.

In the embodiment illustrated, region 142 is disposed adjacent absolute motion region 140. Region 142 comprises a "relative motion region" where a position of movable member 124 from a selected position (for example, home position 150) correlates to speed and direction of cursor 146 on monitor 47. In the embodiment illustrated, region 142 is a "fine relative motion region" where speed of cursor 146 in any given direction is a function of a length of displacement of movable member 124 from home position 150. For example, displacement of movable member 124 to a position 156 defines a first vector 156A from home position 150, while displacement of movable member 124 to a position 158 defines a second vector 158A. In view that vector 156A has a magnitude less than a magnitude of vector 158A, a corresponding speed of movement of cursor 146 for position 156 is less than corresponding speed of movement at position 158. In one embodiment, speed of movement of cursor 146 with displacement of moveable member 124 within region 142 is a monotonically increasing function of radial displacement from home position 150. In other words, the speed of cursor 146 on monitor 47 is a function of a radial distance from an inner boundary of the fine relative motion region 142. However, the invention is not limited to any specific relationship between radial displacement and speed of movement. Thus, alternate embodiments may vary speed according to some profile other than a strictly linear relationship. Higher order relationships (such as speed varying as the square of the displacement as well as piece-wise curve constructs where speed varies according to different relationships as the distance from the inner boundary of the fine relative motion region 142 changes) are all within the scope of the invention. In general, displacement of movable member 124 within fine relative motion region 142 causes corresponding displacement of cursor 146 and virtual displacement of absolute motion region 140 as indicated by vector 153 152 to another portion of the displayed screen on monitor 47.

In the embodiment illustrated, a second relative motion region 144 is disposed adjacent fine relative motion region 142. Relative motion region 144 comprises a "course relative motion region" wherein displacement of movable member 124 to positions therein cause cursor 146 to be displaced by a given distance on monitor 47 at a given rate. For instance, displacement of movable member 124 to a position 160 in coarse relative motion region 144 will cause cursor 146 to be displaced on monitor 47 in a direction corresponding to a vector 160A. In operation, displacement of cursor 146 can appear as a "jump", rather than a continuous movement, which would occur had the position of movable member 124 fallen in fine relative motion region 142. If the operator maintains movable member 124 within coarse relative motion region 144, cursor 146 will appear to jump repeatedly at a selected rate. The distance of the jump as well as the rate of the jumps can be any desired amount, limited only by user perception and preference. At this point, it should also be noted that displacement of cursor 146 to the edge or boundaries of monitor 47 may cause virtual displacement of a page or document displayed on monitor 47 in a direction generally opposite and at a rate described above for regions 142 and 144 so as to give the user the impression that motion is being continued in the selected direction.

FIG. 4 illustrates fine relative motion region 142 disposed radially from and about absolute motion region 140, while coarse relative motion region 144 is disposed radially from and about fine relative motion region 142. As appreciated by those skilled in the art, different orientations of the regions 140, 142 and 144 can be used. Furthermore, although illustrated where regions 142 and 144 are similar (herein concentric), each region 140, 142 and 144 can have a different shape.

Referring back to FIG. 3, movable member 124 can be a pivoting element, such as a lever (joystick) or a sliding plate. In one embodiment, a compliant or spring coupling 168 (schematically illustrated by springs 170A and 170B) couples movable member 124 to base member 122. Spring coupling 168 causes return displacement of movable member 124 to a selected position, such as home position 150 (FIG. 4) when the operator releases movable member 124. In a further embodiment, a spring constant of spring coupling 168 is selected so as to provide increasing resistance to the operator as movable member 124 is displaced from home position 150. A momentary switch 174 can be disposed proximate movable member 124 so as to be engaged selectively when the operator, for example, presses movable member 124 downwardly. As illustrated in FIG. 2A, circuitry 130 and, in particular, processor 132, receives a signal 175 from switch 174 indicative of operation. In a manner similar to mouse 42, described above, processor 132 encodes the status of switch 174 so as to be provided to computer 20. In one mode of operation, operation of switch 174 is similar to operation of the "left-hand" button of mouse 42. In further embodiments, additional switches 176 and 178 can be provided in computer input device 120, for example, to simulate other buttons or switches provided on known mice 42. Known message formatting techniques can be used to encode the status of switches 176 and 178 so as to be provided to computer 20.

Computer input device 120 can include a separate housing than that of computer 20 so as to allow an operator to place the computer input device 20 in any convenient location surrounding the workplace. In this implementation, the computer input device 120 can be connected to computer 20 using an electrical or optical cable. In a further embodiment, wireless connections, for example, infrared or radio frequency communications can be used.

Figure 5:
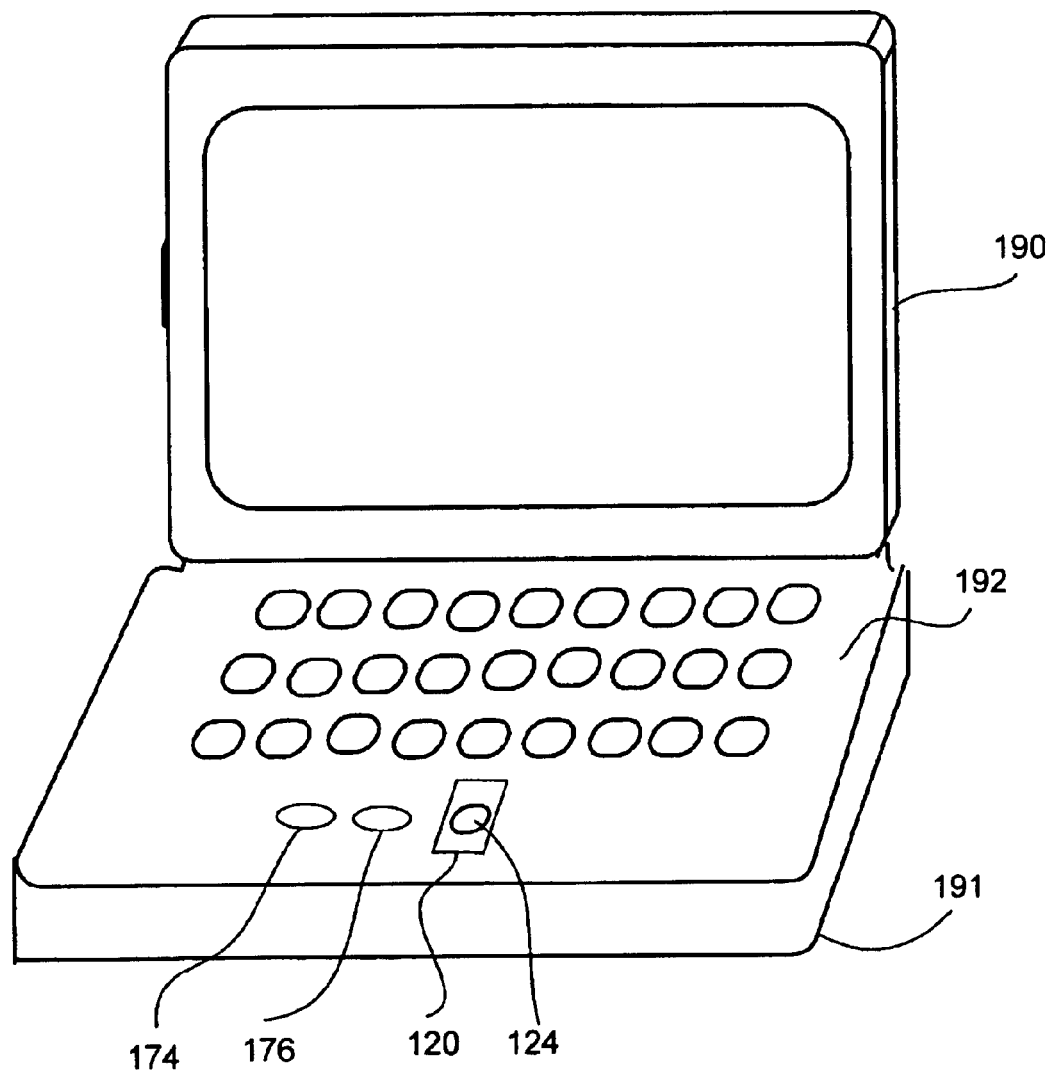
FIG. 5 is a perspective view of a laptop computer having the computer input device.

Alternatively, computer input device 120 can be integrated within the housing of computer 20, keyboard 40, or other support peripheral device. For instance, referring to FIG. 5, computer input device 120 is integrated in a housing 191 of a laptop computer 190. In this embodiment, switches 174 and 176 are illustrated separate from movable member 124, which in some applications may be preferred. The computer input device 120 is particularly well suited for applications, such as laptop computer 190, because it requires only limited space on an operator interface panel 192 and yet provides both absolute and relative cursor motions.

Figure 6A:
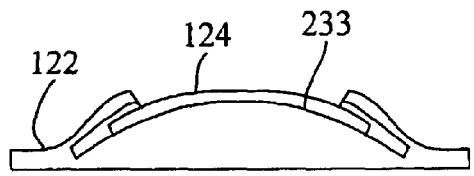
FIG. 6A is a schematic representation of a third embodiment of the computer input device.
Figure 6:
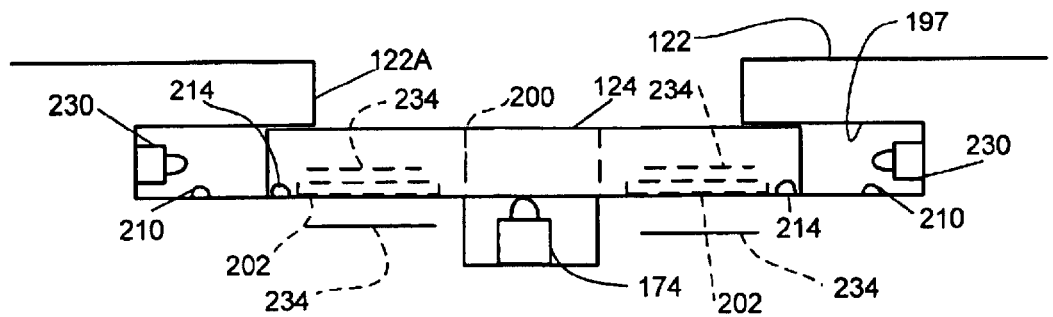
FIG. 6 is a schematic representation of a second embodiment of the computer input device.

In addition to providing support for all mechanical elements therein, the base member or housing 122 can provide two additional features to enhance usability of computer input device 120. The first feature comprises a switch lockout device that supports movable member 124 in a manner such that switch 174 cannot be depressed while movable member 124 is in relative motion regions 142 or 144. Referring to FIG. 6, movable member 124 comprises a plate slide-able on base member 122 in a recess 197. An operator accesses movable member 124 through an aperture 122A. In this embodiment, movable member 124 includes a compliant center portion 200 that can be displaced to actuate switch 174 when center portion 200 is disposed within absolute motion region 140. Movable member 124 further includes a rigid element 202 that surrounds an outer boundary of center portion 200. When movable member 124 is displaced in a manner 20 as to locate center portion 200 in relative regions 142 or 144, rigid element 202 inhibits operation of switch 174. The switch lockout feature may be needed when spring coupling 168 is present between movable member 124 and base 122 since increasing forces may have to be exerted upon movable member 124 as it is displaced from home position 150. The increased forces could cause inadvertent actuation of switch 174.

In a further embodiment, a tactile indication can be provided to the user to indicate entry of movable member 124 in or into any of the regions 140, 142 and 144. One particular boundary transition where tactile feedback may be desired is entry into coarse relative motion region 144. Tactile indication of entry, or imminent entry, into this region may be preferred because displacement of cursor 146 due to entry of region 144 is repetitive and can be in quick succession. In one embodiment, as illustrated in FIG. 6, portions of movable member 124 interact or engage with portions of base member 122 to provide tactile indication. For instance, a ridge or detent 210 is formed on base member 122 that is engaged by movable member 124 when a position of movable member 124 coincides with an inner boundary of coarse relative motion region 144. In a further embodiment, if movable member 124 is formed of a compliant material, rather than a rigid material, movable member 124 will not displace upwardly, but rather, will compress against detent 210.

In yet a further embodiment, it may be desirable to allow movable member 124 to remain in a selected region such as coarse relative motion region 144 without the operator maintaining a force thereon to hold it in position. This aspect can be accomplished, for instance, by providing a groove 214 within movable member 124. Groove 214 receives detent 210, or a portion thereof, and retains movable member 124 in coarse relative motion region 144 until removed by the operator. In this manner, the operator can scroll through a document without maintaining force on movable member 124.

Referring back to FIG. 4, in yet a further embodiment, it may be desirable to define a "dead zone" between any two adjacent regions 140, 142 and 144. For instance, as illustrated, a dead zone 220 is indicated between regions 142 and 144. In dead zone 220, positional information from computer input device 120 does not change in a manner so as to cause movement of cursor 146 on monitor 47. This allows the operator to enter dead zone 220 and make excursions into coarse relative motion region 144 selectively so as to cause quick displacement of cursor 146 within a displayed document or page. For example, this feature would allow the operator to scroll text of a document with small displacements of movable member 124 rather than repeatedly moving movable member 124 from home position 150 into fine relative motion region 142. If desired, engaging portions of movable member 124 and detent 210 can be adapted so as to retain movable member 124 within dead zone 220 and where radial outwardly displacements of movable member 124 from detent 210 cause coarse relative motion of cursor 146. Of coarse, in this embodiment, spring coupling 168 is of insufficient strength to return movable member 124 from dead zone 220 without operator intervention.

Figure 7:
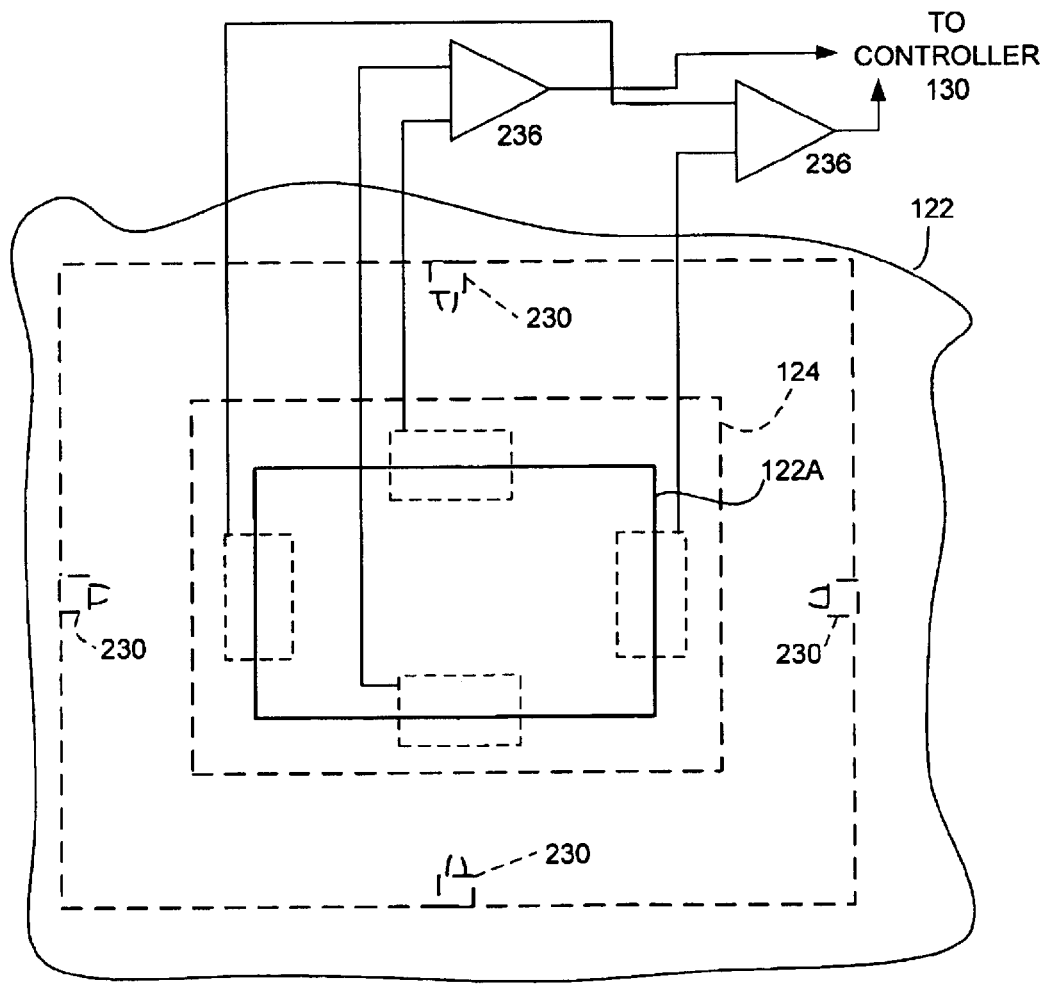
FIG. 7 is a top plan view of the embodiment of FIG. 6.

Referring to FIGS. 6 and 7, a plurality of switches 230 can be provided to detect movement of movable member 124 into coarse relative motion region 144. Generally, switches 230 are mounted to base member 122 in a manner so as to coincide with entry of movable member 124 into coarse relative motion region 144. Although illustrated in FIG. 7 where four switches 230 are present and oriented substantially on orthogonal axes, less or more switches can be used if desired. Switches 230 can be used with tactile indicating structures such as detent 210 described above to enhance tactile feedback to the operator when movable member 124 has entered coarse relative motion region 144. In another embodiment, the tactile structures can be eliminated and where operation of any of switches 230 can provide tactile feedback.

Although illustrated in FIG. 6 wherein movable member 124 is generally flat and slides upon a plane, it should be noted that this is but one exemplary embodiment and that sliding motion of movable member 124 over non-planar surfaces is also possible. FIG. 6A illustrates an embodiment where movable member 124 is compliant, substantially conforming to a rigid support surface 233 of base 122. In yet other embodiments, concave type surfaces alone or in combination with convex type surfaces can also be used, if desired. As previously mentioned, a small joystick or other movable device may also be used.

Referring back to FIG. 3, sensor 126 measures movement of movable member 124 relative to base 122. Generally, sensor 126 is a two-dimensional absolute encoder. Accordingly, output signal 128 provides two-dimensional position information to processor 132. Commonly, two-dimensional position information comprises rectangular coordinates; however, polar coordinates could also be used.

Sensor 126 can measure displacement directly, or indirectly, for example, as a function of force and direction. Output signal 128 can be either analog or digital. Of course, if output signal 128 is digital, analog-to-digital converter 131 may not be necessary. Output signal 128 can be a function of changes in any measurement parameter that is commonly used in displacement or force measuring sensors such as changes in resistance or capacitance. Likewise, optically based systems can also be used. Generally, the regions 140, 142 and 144 can be mapped to variation in resistance, capacitance or any other parameter that varies as a function of displacement from home position 150.

Referring to FIGS. 6 and 7, capacitor plates 234 are connected in operating pairs so as to measure displacement of movable member 124 relative to an axis formed therebetween. Capacitor plates 234 are coupled to operational amplifiers 236 in order to measure differential capacitance. As stated above, other measuring parameters such as change in resistance can also be used.

Figure 8:
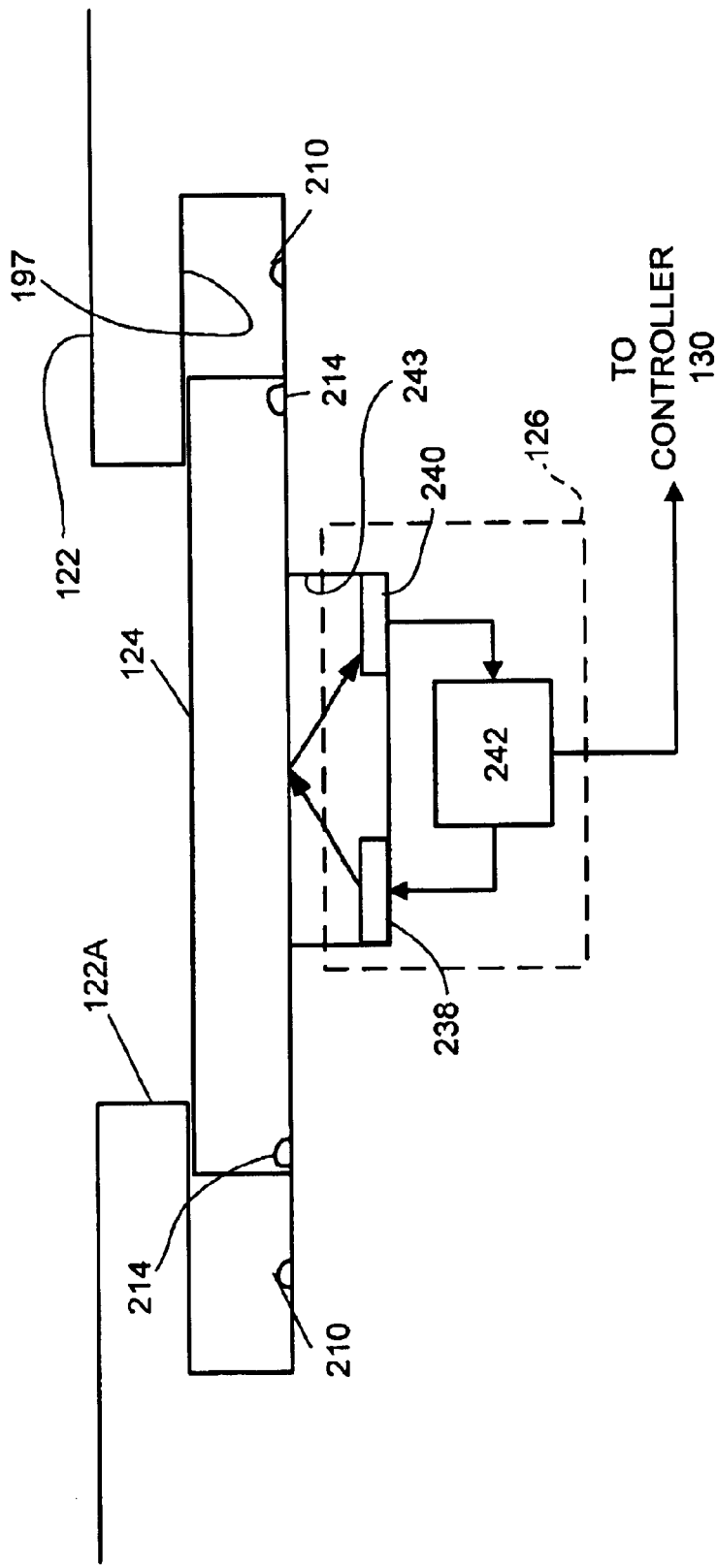
FIG. 8 is a fourth embodiment of the computer input device.

FIG. 8 illustrates an optically based sensor 126. In this embodiment, sensor 126 includes an electromagnetic radiation source (which may simply be a light source such as a LED) 238, an image or pattern detector 240 and a controller 242. Source 238 and image detector 240 are disposed in a recess 243 below movable member 124. Generally, radiation emitted from source 238 impinges upon a lower surface of movable member 124, which can have a predetermined pattern or image thereon. The light (electromagnetic radiation) then reflects off the lower surface of movable member 124 and toward image detector 240. Image detector 240, in one illustrative embodiment, is an artificial retina manufactured by Mitsubishi Electric Corporation and includes a two-dimensional array of variable sensitivity photo detectors, which operates in a known manner. By comparing successive images, relative or absolute position of movable member 124 relative to base member 122 can be ascertained. This technology is described in detail in pending U.S. patent application Ser. No. 09/217,403 filed Dec. 21, 1998, entitled "IMAGE SENSING OPERATOR INPUT DEVICE", and assigned to the same assignee as the present application, and U.S. Pat. No. 5,581,094 issued to Hara et al. Entitled "PHOTO DETECTOR ARRAY COMPRISING PHOTO DECTORS AND OBJECT DETECTOR COMPRISING THE PHOTO DETECTOR ARRAY AND AN OBJECT DETECTING PROCEDURE" assigned to Mitsubishi Electric Corporation, both of which are hereby incorporated by reference in their entirety.

As stated above, circuitry 130 receives and processes output 128 so as to provide positional information as a function of each of the defined regions 140, 142 and 144. In the embodiment illustrated, processor 136 executes instructions stored in computer readable medium 134 to map a position of movable member 124 relative to base member 122 into each of the regions 140, 142 and 144. In addition to this basic mapping operation or routine, additional routines can be executed in order to perform additional processing as described below. It should be noted that although described below with respect to processor 136, the additional routines described below, as well as the basic mapping routine, can be performed in part, or in their entirety, by processors remote from processor 136. For instance, mouse driver 60 (FIG. 2A) can include instructions to perform the basic mapping routine as well as some or all of the additional routines discussed below. In such a case, the instructions can reside on any suitable computer readable medium discussed above.

Absolute Motion Scaling

Fine absolute motion scaling adjusts the one-to-one correspondence of movements made by movable member 124 within absolute region 140 to movements made by cursor 146 in FIG. 4. In general, absolute motion region 140 is scaled to be an appropriate function of target size. The greater the scale, the coarser the resolution in absolute motion region 140. In one embodiment, scaling is adjustable where scale factors are stored in memory 134 or on computer 20 (FIG. 2A).

Absolute Motion Acceleration

Absolute motion acceleration is the known practice of increasing cursor speed if a pointing device, such as mouse 42 (FIG. 2A), is moved quickly. Processor 136 can execute similar code in memory 134 to also provide this feature in absolute motion region 140.

Fine Relative Motion Scaling

Figure 9:
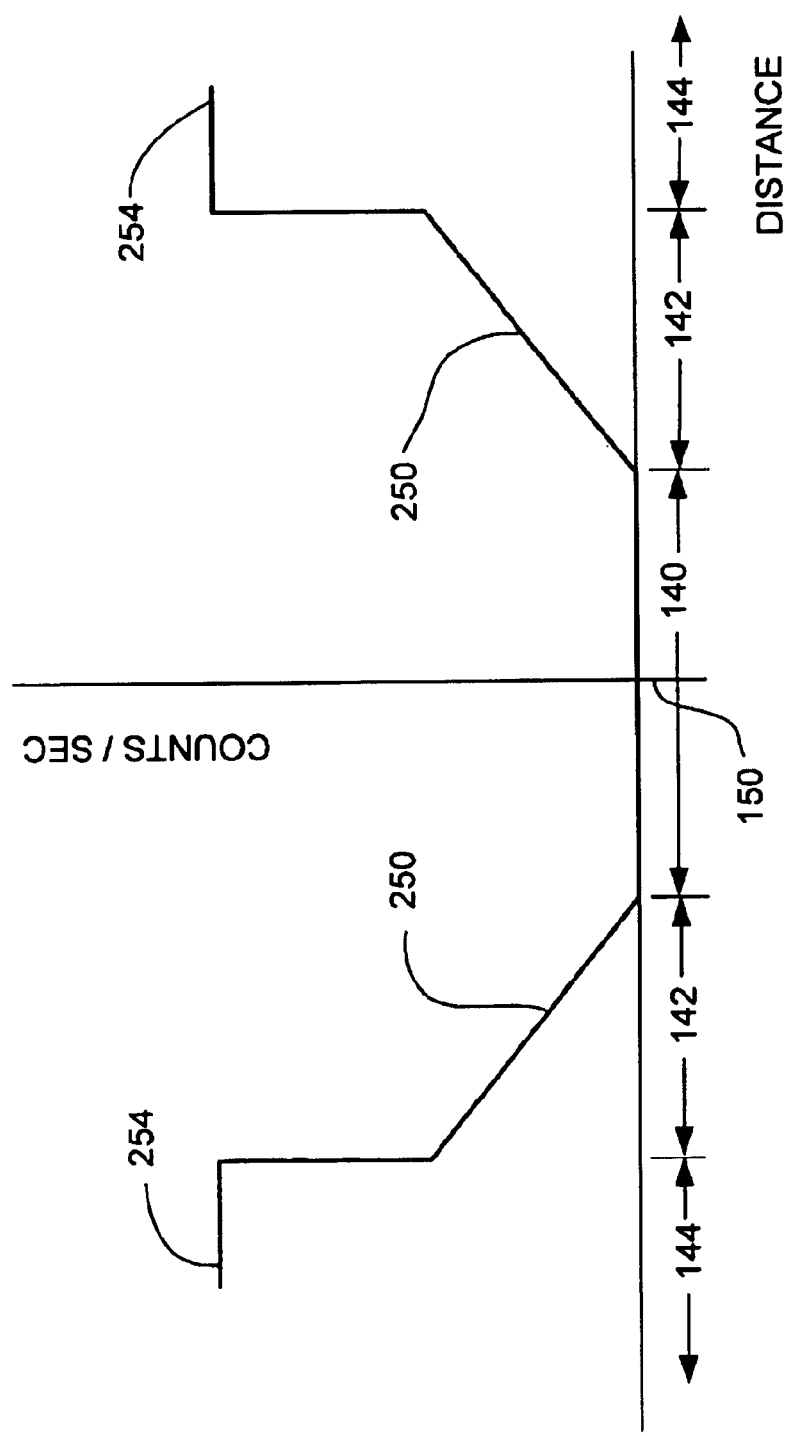
FIG. 9 is a graphical representation of positional information provided by the computer input device.

FIG. 9 pictorially illustrates a rate of update positional information as a function of distance from home position 150. Each of the regions 140, 142 and 144 have been indicated on the horizontal axis, while the vertical axis indicates counts (positional information) per second that the computer input device 120 will provide when the actuator is moved in the corresponding regions. Since absolute motion region 140 provides one-to-one correspondence between movements of movable member 124 and movements of cursor 146, the cursor 146 does not move simply because movable member 124 is within this region. Thus, as represented in FIG. 9, absolute motion region 140 is shown on the horizontal axis. However, when movable member 124 is moved into fine relative motion region 142, cursor 146 will continue to move on monitor 47 even if movable member 124 remains stationary in fine relative motion region 142. Line segments 250 represent the rate of update positional information for cursor 146, which increases as a function of distance away from home position 150. Fine relative motion scaling pertains to the shape and orientation of line segments 250. Memory 134 (FIG. 2A) stores parameters (which may be adjustable) to provide update positional information in accordance with line segment 250. In the embodiment illustrated, where line segments 250 are linear, fine relative motion scaling relates to the slope or inclination of line segments with respect to the horizontal axis. In general, the relationship between counts/second and distance in region 142 can be any monotonically increasing function. Fine relative motions scaling allows the operator to adjust update characteristics of computer input device 120 within fine relative motion region 144.

Fine Relative Motion Blanking

Fine relative motion blanking inhibits (blanks) update position information, and thus, cursor motion, during the return stroke of movable member 124 back to home position 150. The advantage of this feature can be appreciated by considering a standard relative motion device, such as a joystick. Since a joystick translates all actuator displacement into motion and spring coupling returns the actuator back to home upon release, the operator must anticipate how much cursor movement will occur when the actuator is released. This involves a judgement on the part of the user concerning how much additional cursor displacement will occur as the actuator travels back to the joystick's resting position. If this guess is wrong, the user must then compensate with small, relatively slow motions near the resting position of the joystick. Fine relative motion blanking alleviates this problem by inhibiting cursor motion as movable member 124 is released (assuming spring coupling 168 is present). Through the use of this feature, the operator need only anticipate his own reaction time in relative motion region 142. In operation, the operator now navigates by displacing movable member 124 into relative motion region 142, thereby moving cursor 146 toward a selected target. When the cursor 146 reaches the target, the operator can release movable member 124. The movable member 124 will then automatically return to home position 150 due to spring coupling 168; however, the cursor 146 will remain stationary. This technique is more accurate and direct than entering region 142 and then trying to return to absolute motion region 140 to slow speed of cursor 146 in a controlled fashion.

In the embodiment illustrated, processor 136 receives output 128. Suitable instructions and/or routines can be stored in memory 134 to calculate speed and acceleration of movable member 124. In particular, since output 128 can be proportional to an absolute position of movable member 124 with respect to a fixed coordinate system, a first derivative of output signal 128 will realize current speed of movable member 124, while a second derivative of output 128 will realize current acceleration of movable member 124. Known characteristics of speed and acceleration for "released" movements of movable member 124 (due to spring coupling 168) can be stored in memory 134. During operation, processor 132 continuously compares the stored parameters with current characteristics of output 128. When current characteristics of output 128 match stored "released" characteristics, update position information is inhibited. Blanking persists until processor 132 senses that movable member 124 is once again being manipulated by the operator.

Coarse Relative Motion Blanking

Coarse relative motion blanking is similar to fine relative motion blanking discussed above. Referring to FIG. 4, dead zone 220 may be provided between fine relative motion region 142 and coarse relative motion region 144. Dead zone 220 allows the operator to "park" movable member 124 near entry into coarse relative motion region 144 without having cursor 146 move. In this manner, the operator can enter coarse relative motion region 144 and cause corresponding displacement of cursor 146. However, during the return stroke of movable member 124 back into dead zone 220 from coarse relative motion region 144, update position information is not provided to computer 20.

Coarse Relative Motion Repeat Rate and Coarse Relative Motion Scaling

Referring back to FIG. 9, line segments 254 represent update counts of positional information for movement of movable member 124 within coarse relative motion region 144. Coarse relative motion repeat rate adjusts the rate (counts/sec) that cursor 146 will move while in region 144. Coarse relative motion scaling adjusts how far cursor 146 will be displaced for each update count in region 144. Memory 134 (FIG. 2A) stores parameters in accordance with line segments 254.

Coarse Relative Rounding

Referring back to FIG. 4, since the operator must move movable member 124 through absolute movement region 140 and fine relative motion region 142 before entering coarse relative motion region 144, it may be desirable to adjust subsequent cursor motion through regions 140 and 142 to equate to the motion provided in coarse relative motion region 144. In other words, if processor 132 ascertains a quick and consistent traversal through regions 140 and 142, the processor 132 can assume that coarse relative motion of cursor 146 is intended. In such a case, if coarse relative motion region 144 is entered, displacement of cursor 146 through regions 140 and 142 will approximate one entry into coarse relative motion region 144.

Detent Detection

Figure 10:
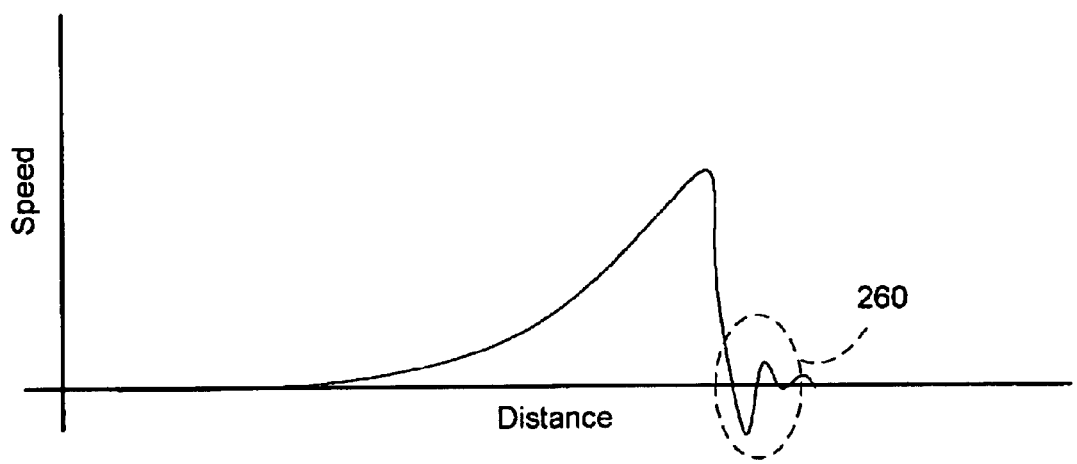
FIG. 10 is a graph illustrating contact of a movable member with a tactile indicating structure.

In some of the embodiments described above, entry into coarse relative motion region 144 can be ascertained by processing a current position of movable member 124 with respect to a fixed coordinate system. In this manner, if movable member 124 obtains a position that coincides with coarse relative motion region 144, positional information from computer input device 120 corresponds to coarse relative motion movement. Alternatively, switches 230 can be provided to indicate when movable member 124 has entered coarse relative motion region 144. In yet another embodiment, processor 132 can compare characteristics of output 128 with stored characteristics when movable member 124 engages a tactile indicator such as detent 210. Referring to FIG. 10, the speed of movable member 124 is provided as a function of distance. Region 260 represents contact of movable member 124 with the tactile indicator such as detent 210. One aspect of the present invention includes storing characteristic information of contact of movable member 124 with a tactile indicator, monitoring current characteristics of output signal 128 provided by sensor 126, and comparing current characteristics of output signal with stored characteristics to determine whether movable member 124 has contacted the tactile indicator.

Another aspect of the present invention is to calibrate the position of the coarse relation motion boundary 144 using contact of the movable member 124 with the tactile indicators. In particular, the method includes monitoring current characteristics of the output signal 128 provided by the sensor 126, and comparing current characteristics to determine whether movable member 124 has contacted the tactile indicator. Upon detection of the tactile indicator, the position of movable member 124 is noted and used to define the boundary of coarse relative motion region 144. A plurality of spaced-apart measurements can be obtained, if desired, to further define the boundary of coarse relative motion region 144. The portion of the boundary between absolute motion region 140 and fine relative motion region 142 can be determined as a function of the position of coarse relative motion region 144 or independently using other indicators.

In the embodiment illustrated, the speed of movable member 124 is shown; however, it should be understood that other characteristics such as acceleration taken alone or in combination with speed characteristics can also be used.

Although the present invention has been described with reference to preferred embodiments, workers skilled in the art will recognize that changes may be made in form and detail without departing from the spirit and scope of the invention.

What is claimed is:

1. A computer input device comprising:
a base;
a movable member displaceable relative to the base;
a sensor operably coupled to the movable member, the sensor providing an output signal indicative of a position of the movable member relative to the base; and
circuitry operably coupled to the sensor to receive the output signal and define movements of the movable member relative to the base as within an absolute motion region and a relative motion region and provide positional information as a function of the regions, wherein in the relative motion region, the movable member has a displacement relative to a home position, wherein the circuitry is operably coupled to a computer readable medium to execute instructions, and wherein the circuitry detects a return stroke of the movable member to a selected position and inhibits providing positional information during at least part of the return stroke.

2. The computer input device of claim 1 and further comprising a computer readable medium storing instructions, and wherein the circuitry comprises a processor operably coupled to the sensor to receive the output signal and operably coupled to the computer readable medium to execute the instructions, wherein the instructions when executed define the position of the movable member relative to the base as within the absolute motion region and the relative motion region, the processor processing the output signal to provide positional information as a function of one of the defined regions.

3. The computer input device of claim 2 wherein the computer input device is connected to a host computer, and wherein the computer readable medium is located in the host computer and the processor is located in the host computer.

4. The computer input device of claim 3 wherein the movable member includes a portion cooperative with the base to provide a tactile indication of entry of the movable member into the relative motion region.

5. The computer input device of claim 4 wherein the instructions include a portion that when executed by the processor processes the output signal to detect the tactile indication.

6. The computer input device of claim 5 wherein the computer readable medium stores information related to the tactile indication, and the processor compares a parameter of the output signal to the information to detect the tactile indication.

7. The computer input device of claim 1 a switch positioned beneath the movable member and connected to the circuitry.

8. The computer input device of claim 1 wherein the base comprises a rigid support having a non-planar support surface, and wherein the movable member is compliant conforming to the support surface.

9. A computer input device comprising:
a base;
a movable member displaceable relative to the base;
a sensor operably coupled to the movable member, the sensor providing an output signal indicative of a position of the movable member relative to the base;
circuitry operably coupled to the sensor to receive the output signal and define movements of the movable member relative to the base as within an absolute motion region and a relative motion region and provide positional information as a function of the regions, wherein in the relative motion region, the movable member has a displacement relative to a home position; and
a computer readable medium storing instructions, wherein the circuitry comprises a processor operably coupled to the sensor to receive the output signal and operably coupled to the computer readable medium to execute the instructions, wherein the instructions when executed define the position of the movable member relative to the base as within the absolute motion region and the relative motion region, the processor processing the output signal to provide positional information as a function of one of the defined regions, wherein the computer input device is connected to a host computer, wherein the computer readable medium is located in the host computer and the processor is located in the host computer, and wherein the circuitry includes memory for storing parameters indicative of characteristics of one of the regions.

10. The computer input device of claim 9 wherein the relative motion region comprises a fine relative motion region and a coarse relative motion region.

11. The computer input device of claim 10 wherein the relative motion region is disposed radially from and about the absolute motion region.

12. The computer input device of claim 11 wherein the coarse relative motion region is disposed radially from and about the fine relative motion region.

13. The computer input device of claim 12 wherein the instructions when executed define a dead zone where movements of the movable member within the dead zone do not change the positional information.

14. The computer input device of claim 13 wherein the dead zone is disposed between the fine relative motion region and the coarse relative motion region.

15. A computer input device comprising:
a base;
a movable member displaceable relative to the base;
a sensor operably coupled to the movable member, the sensor providing an output signal indicative of a position of the movable member relative to the base;
circuitry operably coupled to the sensor to receive the output signal and define movements of the movable member relative to the base as within an absolute motion region and a relative motion region and provide positional information as a function of the regions, wherein in the relative motion region, the movable member has a displacement relative to a home position;
a computer readable medium storing instructions, and wherein the circuitry comprises a processor operably coupled to the sensor to receive the output signal and operably coupled to the computer readable medium to execute the instructions, wherein the instructions when executed define the position of the movable member relative to the base as within the absolute motion region and the relative motion region, the processor processing the output signal to provide positional information as a function of one of the defined regions, wherein the computer input device is connected to a host computer, wherein the computer readable medium is located in the host computer and the processor is located in the host computer, wherein the movable member includes a portion cooperative with the base to provide a tactile indication of entry of the movable member into the relative motion region, wherein the instructions include a portion that when executed by the processor processes the output signal to detect the tactile indication, wherein the computer readable medium stores information related to the tactile indication, and the processor compares a parameter of the output signal to the information to detect the tactile indication, and wherein the parameter of the output signal comprises a derivative of the output signal.

16. The computer input device of claim 15 wherein the parameter of the output signal comprises a second-order derivative of the output signal.

17. The computer input device of claim 16 and further comprising a spring coupling joining the movable member and the base to return the movable member to substantially a selected position relative to the base for movements from the selected position.

18. The computer input device of claim 17 wherein the computer instructions include a portion to detect a return stroke of the movable member to the selected position as a function of an initial movable member position and spring coupling and inhibit update positional information during at least part of the return stroke.

19. The computer input device of claim 18 wherein update positional information is inhibited during a portion of the return stroke in the relative motion region.

20. The computer input device of claim 17 wherein the portion of the computer instructions calculate at least one of a speed and acceleration of the movable member.

21. The computer input device of claim 20 wherein the selected position is disposed in the absolute motion region.

22. The computer input device of claim 21 wherein the relative motion region comprises a fine relative motion region and a coarse relative motion region, and wherein the fine relative motion region is disposed radially from and about the absolute motion region, and the coarse relative motion region is disposed radially from and about the fine relative motion region.

23. The computer input device of claim 22 wherein the instructions when executed define a dead zone where movements of the movable member within the dead zone do not change the positional information.

24. The computer input device of claim 23 wherein the dead zone is disposed between the fine relative motion region and the coarse relative motion region.

25. The computer input device of claim 24 wherein the movable member includes a portion cooperative with the base to provide a tactile indication of entry of the movable member into the coarse relative motion region.

26. The computer input device of claim 24 wherein the spring coupling is insufficient to return the movable from the dead zone without operator intervention.

27. A computer input device comprising:
a base;
a movable member displaceable relative to the base;
a spring coupling joining the movable member and the base to return the movable member to substantially a selected position relative to the base during a return stroke;
a sensor operably coupled to the movable member, the sensor providing an output signal indicative of movements of the movable member relative to the base during the return stroke;
a computer readable medium storing instructions; and
a processor operably coupled to the sensor to receive the output signal and operably coupled to the computer readable medium to execute the instructions, wherein the processor detects the return stroke of the movable member to the selected position as a function of the spring coupling, the processor processing the output signal to provide positional information and where positional information is inhibited during at least part of the return stroke.

28. The computer input device of claim 27 wherein the instructions calculate at least one of a speed and acceleration of the movable member.

29. A computer input device comprising:
a base;
a movable member displaceable relative to the base;
a spring coupling joining the movable member and the base to return the movable member to substantially a selected position relative to the base during a return stroke;
a sensor operably coupled to the movable member, the sensor providing an output signal indicative of movements of the movable member relative to the base during the return stroke;
a computer readable medium storing instructions; and
a processor operably coupled to the sensor to receive the output signal and operably coupled to the computer readable medium to execute the instructions, wherein the processor detects the return stroke of the movable member to the selected position as a function of the spring coupling, the processor processing the output signal to provide positional information and where positional information is inhibited during at least part of the return stroke, wherein the instructions include a portion to calculate a derivative of the output signal.

30. A computer input device comprising:
a base;
a movable member displaceable relative to the base;
a spring coupling joining the movable member and the base to return the movable member to substantially a selected position relative to the base during a return stroke;
a sensor operably coupled to the movable member, the sensor providing an output signal indicative of movements of the movable member relative to the base during the return stroke;
a computer readable medium storing instructions; and
a processor operably coupled to the sensor to receive the output signal and operably coupled to the computer readable medium to execute the instructions, wherein the processor detects the return stroke of the movable member to the selected position as a function of the spring coupling, the processor processing the output signal to provide positional information and where positional information is inhibited during at least part of the return stroke, wherein the instructions include a portion to calculate a second-order derivative of the output signal.

31. A computer input device comprising:
a base;
a movable member displaceable relative to the base and including a tactile indicator cooperative with the base to indicate when the movable member has reached a boundary between a plurality of regions of the movable member relative to the base;
a sensor operably coupled to the movable member, the sensor providing an output signal indicative of movements of the movable member relative to the base;
a computer readable medium storing instructions; and
a processor operably coupled to the sensor to receive the output signal and operably coupled to the computer readable medium to execute the instructions to detect that the movable member has reached the boundary between the plurality of regions of the movable member relative to the base member, wherein each of the regions is associated with different characteristics in the output signal, wherein in one of the regions, the movable member has a displacement relative to a home position, and wherein the processor further executes the instructions to detect a return stroke of the movable member from the one of the regions to the home position and at least partially inhibits positional information during the return stroke.

32. The computer input device of claim 31 wherein the instructions calculate at least one of a speed and acceleration of the movable member.

33. A computer input device comprising:
a base;
a movable member displaceable relative to the base and including a tactile indicator cooperative with the base to indicate when the movable member has reached a boundary between a plurality of regions of the movable member relative to the base;
a sensor operably coupled to the movable member, the sensor providing an output signal indicative of movements of the movable member relative to the base;
a computer readable medium storing instructions; and
a processor operably coupled to the sensor to receive the output signal and operably coupled to the computer readable medium to execute the instructions to detect that the movable member has reached the boundary between the plurality of regions of the movable member relative to the base member, wherein each of the regions is associated with different characteristics in the output signal and wherein in one of the regions, the movable member has a displacement relative to a home position, wherein the instructions include a portion to calculate a second-order derivative of the output signal.

34. A method of providing positional information to a computer, the method comprising:
defining movements of a movable member relative to a base member in an absolute motion region and a relative motion region of the movable member relative to the base member, wherein in the relative motion region the movable member is displaced relative to a home position;
measuring movements of the movable member relative to the base member and during a return stroke of the movable member to the home position; and
processing the movements to provide positional information as a function of one of the regions of the movable member relative to the base member and at least partially inhibiting positional information during the return stroke.

35. A method of providing positional information to a computer, the method comprising:
defining movements of a movable member relative to a base member in an absolute motion region and a relative motion region of the movable member relative to the base member, wherein in the relative motion region the movable member is displaced relative to a home position;
measuring movements of the movable member relative to the base member and during a return stroke of the movable member to the home position;
processing the movements to provide positional information as a function of one of the regions of the movable member relative to the base member, and further comprising generating a tactile indication of entry of the movable member into the relative motion region and at least partially inhibiting positional information during the return stroke.

36. The method of claim 35 wherein the step of measuring comprises providing an output signal from a sensor operably coupled to the movable member, and wherein the method further comprises processing the output signal to detect the tactile indication.

37. The method of claim 36 and further comprising storing information related to the tactile indication, and wherein the step of processing includes comparing a parameter of the output signal to the information to detect the tactile indication.

38. The method of claim 37 wherein the parameter of the output signal comprises a derivative of the output signal.

39. The method of claim 38 wherein the parameter of the output signal comprises a second-order derivative of the output signal.

40. A method of providing positional information to a computer, the method comprising:
defining movements of a movable member relative to a base member in an absolute motion region and a relative motion region of the movable member relative to the base member, wherein in the relative motion region the movable member is displaced relative to a home position;
measuring movements of the movable member relative to the base member;
releasing the movable member from a position remote from a selected position to return the movable member to substantially the selected position; and
processing the movements to provide positional information as a function of one of the regions of the movable member relative to the base member, and at least partially inhibiting positional information when the movable member is released to return to substantially the selected position.

41. The method of claim 40 and further comprising detecting a return stroke of the movable member to the selected position and inhibiting update positional information during at least part of the return stroke.

42. The method of claim 41 wherein update positional information is inhibited during a portion of the return stroke in the relative motion region.

43. The method of claim 42 wherein the step of measuring comprises providing an output signal from a sensor operably coupled to the movable member, and wherein the step of detecting comprises processing the output signal to detect at least one of a speed and acceleration of the movable member.

44. A method of providing positional information to a computer, the method comprising:
displacing a movable member to a displaced position relative to a base member;
releasing the movable member so that the movable member returns in a return stroke to a selected position relative to the base member;
sensing movements of the movable member relative to the base member and generating a changing output signal as a function of said movements;
processing the movements to provide positional information for selected movements of the movable member relative to the base member; and
detecting when the movable member has been released and inhibit providing positional information for at least part of the return stroke to the selected position of the movable member relative to the base member.

45. A method of providing positional information to a computer, the method comprising:
displacing a movable member to a displaced position relative to a base member;
releasing the movable member so that the movable member returns in a return stroke to a selected position relative to the base member;
sensing movements of the movable member relative to the base member and generating a changing output signal as a function of said movements;
processing the movements to provide positional information for selected movements of the movable member relative to the base member; and detecting when the movable member has been released and inhibiting providing positional information for at least part of the return stroke to the selected position of the movable member relative to the base member, wherein the step of detecting includes calculating at least one of a speed and acceleration of the movable member.

46. The method of claim 45 wherein the step of calculating includes calculating a derivative of the output signal.

47. The method of claim 46 wherein the step of calculating includes calculating a second-order derivative of the output signal.

48. A method of providing positional information to a computer, the method comprising:

sensing movements of a movable member relative to a base member into a plurality of regions, the movements including return strokes to a selected position of the movable member relative to the base, and generating a changing output signal as a function of said movements;

processing the movements to provide positional information for movements of the movable member relative to the base member, wherein the positional information is at least partially inhibited during return strokes;

generating a tactile indication when the movable member has reached a boundary between the plurality of regions of the movable member relative to the base member, wherein the positional information of each region has different characteristics in the output signal; and detecting return strokes and when the movable member has reached the boundary between the plurality of regions of the movable member relative to the base member as a function of the characteristics of the output signal.

49. A method of processing displacement data from an input device having a member movable through a range of motion relative to a base in order to update information displayed on a display device of a computer system, the method comprising:

receiving, from a sensor, information regarding displacement of the member relative to the base and release of the movable member to return in a return stroke the movable member to a selected position of the movable member relative to the base;

mapping, by either the input device or the computer, the displacement information into at least one of an absolute motion region and a relative motion region for movements of the movable member relative to the base, each region having associated characteristics that influence the update of the information on the display device; and determining how the displacement information on the display device should be updated based on the characteristics associated with the at least one mapped region, wherein determining comprises at least partially inhibiting update of the displacement information during the return stroke to a selected position of the movable member relative to the base.

* * * * *